United States Patent [19]
Hori et al.

[11] Patent Number: 5,906,428
[45] Date of Patent: May 25, 1999

[54] VEHICLE LAMP WITH DISCHARGE BULB

[75] Inventors: Takashi Hori; Hitoshi Takeda; Masatoshi Yoneyama; Hirokazu Endo; Yoshio Suehiro, all of Shizuoka, Japan

[73] Assignee: Koito Manufacturing Co., Ltd., Tokyo, Japan

[21] Appl. No.: 08/848,658

[22] Filed: Apr. 29, 1997

[30]     Foreign Application Priority Data

Apr. 30, 1996   [JP]   Japan ................................ 8-108891

[51] Int. Cl.⁶ .................................................. B60Q 1/04
[52] U.S. Cl. .......................... 362/265; 362/510; 362/546
[58] Field of Search .................................. 362/263, 265, 362/510, 546, 293, 467

[56]           References Cited

U.S. PATENT DOCUMENTS

| | | | |
|---|---|---|---|
| 5,113,330 | 5/1992 | Makita | 362/265 |
| 5,140,504 | 8/1992 | Sato | 362/61 |
| 5,228,766 | 7/1993 | Makita et al. | 362/61 |
| 5,343,370 | 8/1994 | Ohashi et al. | 362/61 |
| 5,722,768 | 3/1998 | Suzuki et al. | 362/265 |

*Primary Examiner*—Y. Quach
*Attorney, Agent, or Firm*—Sughrue, Mion, Zinn, Macpeak & Seas, PLLC

[57]           ABSTRACT

A reflector 11 to which a discharge bulb 16 is attached is made of a conductive material, and a casing (turn-on circuit casing 30) made of a conductor is attached to a rear-side opening portion of a lamp body enclosing the reflector so that the opening is closed. A grounded shielding tube 21 is provided to enclose the discharge bulb 16, and a grounded extension reflector 3B is disposed at the opening of the reflector 11. At least the reflector 11 and the casing 30 are collectively grounded so that it becomes possible to suppress the electromagnetic waves radiated from the discharge bulb 16 to its circumference.

20 Claims, 8 Drawing Sheets

VEHICLE LAMP WITH DISCHARGE BULB

BACKGROUND OF THE INVENTION

1. Field of the Invention

The present invention relates to vehicle lamps suitable for use as car front lamps, and particularly to a vehicle lamp using a discharge bulb as a light source in which influence of electromagnetic waves is prevented from acting on the lamp.

2. Background Art

Recently, the idea of using a discharge bulb as a light source for a car lamp has been considered. The reason is that a discharge bulb is excellent in luminous efficiency and color rendering property, and has a long life time. A lamp of this kind, however, requires a high voltage for generating a discharge in the discharge bulb. Accordingly, it is necessary to provide a turn-on circuit on the lamp to raise the voltage of the car battery to a required high value. Further, since a high voltage is generated on the secondary side of the turn-on circuit, electromagnetic waves are radiated outside with the generation of the high voltage and the electromagnetic waves have an influence, as noise, on various car electronic apparatuses to thereby disturb the normal operation of these apparatuses. For example, noise is generated in a radio receiver or noise is mixed into a signal system of a microcomputer mounted on a car, that is, a so-called EMI (electromagnetic interference) is generated.

Further, electromagnetic waves are generated also in the discharge bulb to which the foregoing high voltage is applied and the foregoing EMI is generated by the electromagnetic waves radiated from the discharge bulb. Therefore, for example, JP-A-5-101703 discloses a vehicle lamp in which a shielding member is provided along an inner surface of a lamp body so as to shield a circumference of a discharge bulb and/or a reflector. According to this technique, the radiation of electromagnetic waves to the circumference of the discharge bulb is suppressed through the shielding member to thereby cope with EMI.

This conventional technique is effective in suppression of radiation of electromagnetic waves toward the circumference of the discharge bulb. However, it is necessary to provide a shielding member throughout the circumference of a reflector provided in the lamp body. Therefore, in order to create the space for arranging the shielding member, the size of the lamp body must be increased. Consequently, the conventional technique is not suitable for forming a small sized lamp. An additional complication results from the fact that the reflector is tilted in the up/down and right/left directions in order to adjust the optical axis (i.e., to aim the light). Since the shielding member is provided to cover the region in front of the reflector, which moves relatively large distances at the time of the adjustment of aiming, it is necessary to provide correspondingly large distances between the reflector and the shielding member for the purpose of preventing interference between the reflector and the shielding member. Consequently, the lamp body is necessarily large in size.

Further, in this conventional technique, it is difficult to suppress radiation of electromagnetic waves from a cap of the discharge bulb, that is, a bulb socket portion, although the technique is effective in suppression of radiation of electromagnetic waves from the portion of the discharge bulb enclosed by the shielding member. There is also a fear that electromagnetic waves from the bulb socket portion are radiated outside through the lamp body which is made of resin. In this case, although such electromagnetic waves can be suppressed if the lamp body is made of a metal material, the total weight of the lamp increases. Further, it is difficult to suppress electromagnetic waves radiated from the gap between the shielding member and the reflector to the front side of the lamp.

SUMMARY OF THE INVENTION

An object of the present invention is to provide a vehicle lamp with a discharge bulb in which radiation of electromagnetic waves is effectively suppressed, while at the same time allowing the size and weight of the lamp to be reduced.

In order to achieve the above object, according to the present invention, a vehicle lamp with a discharge bulb include a lamp body in which the discharge bulb is disposed, a reflector made of a conductive material mounted inside the lamp body for reflecting light from the discharge bulb, and a casing made of a conductive material, the casing being attached to an opening portion in the lamp body at a position behind the discharge bulb to cover the opening portion, the casing and the reflector both being grounded.

In the above vehicle lamp with a discharge bulb, a shielding member (such as a tube) made of a conductive material is preferably provided between the discharge bulb and the lamp body so as to cover a circumference of the discharge bulb, the shielding member being electrically connected to the reflector. Further, an cylindrical lens holder made of a conductive material is attached to a front surface opening portion of the reflector and is electrically connected to the reflector. Further, a extension reflector made of a conductive material is disposed so as to close a gap between the reflector and the lamp body and is electrically connected to the reflector. In this case, preferably, the discharge bulb is attached to the reflector through a socket holder, an electrode is provided on a portion of the reflector in the vicinity of the socket holder, and grounding connection wire is connected to the electrode.

BRIEF DESCRIPTION OF THE DRAWING FIGURES

FIGS. 1(*a*) and 1(*b*) are front and rear views, respectively, of an embodiment of the front lamp according to the present invention.

DETAILED DESCRIPTION OF THE PREFERRED EMBODIMENTS

Figure 1A:
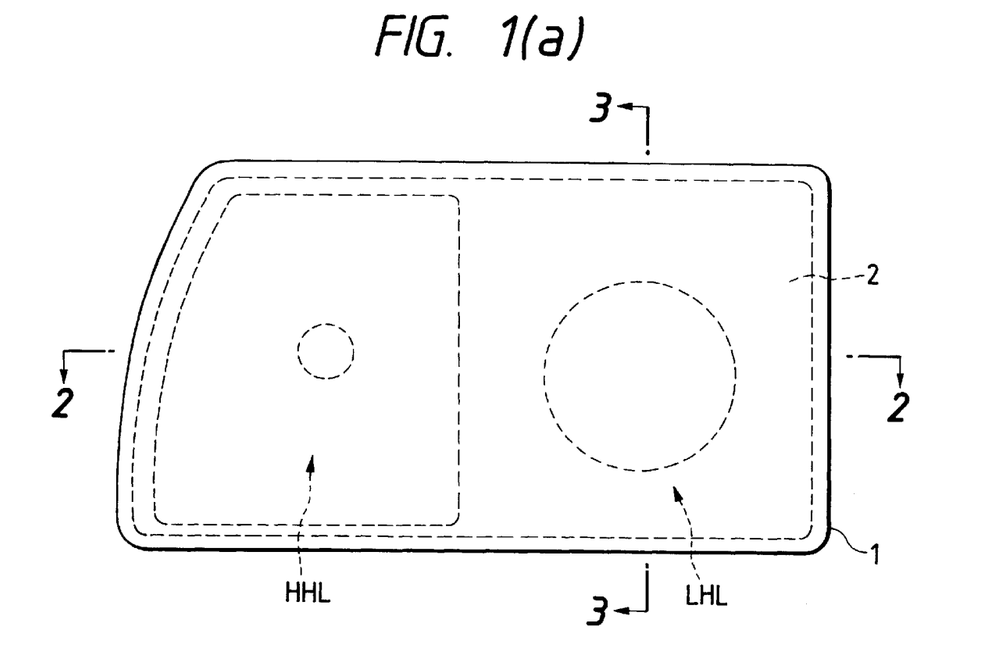
Figure 1B:
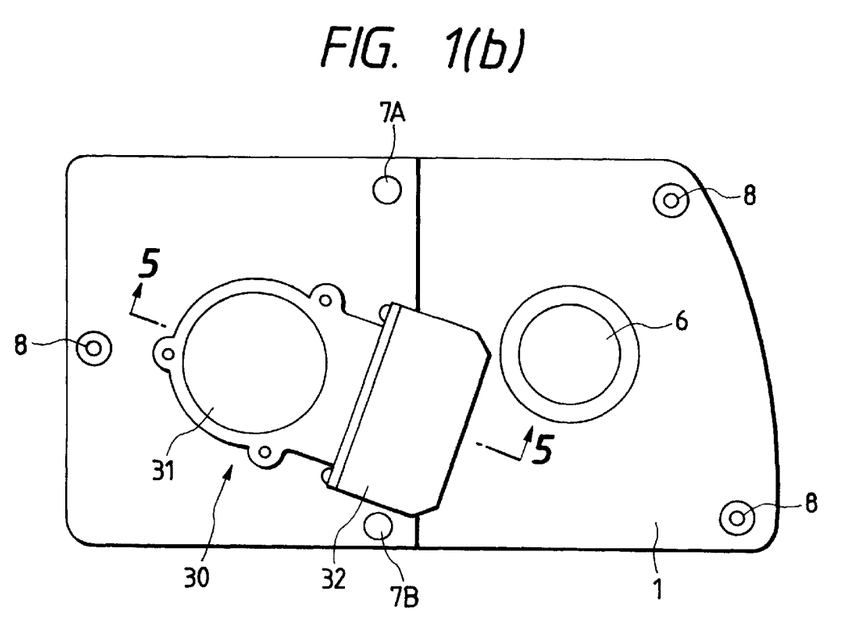
Figure 2:
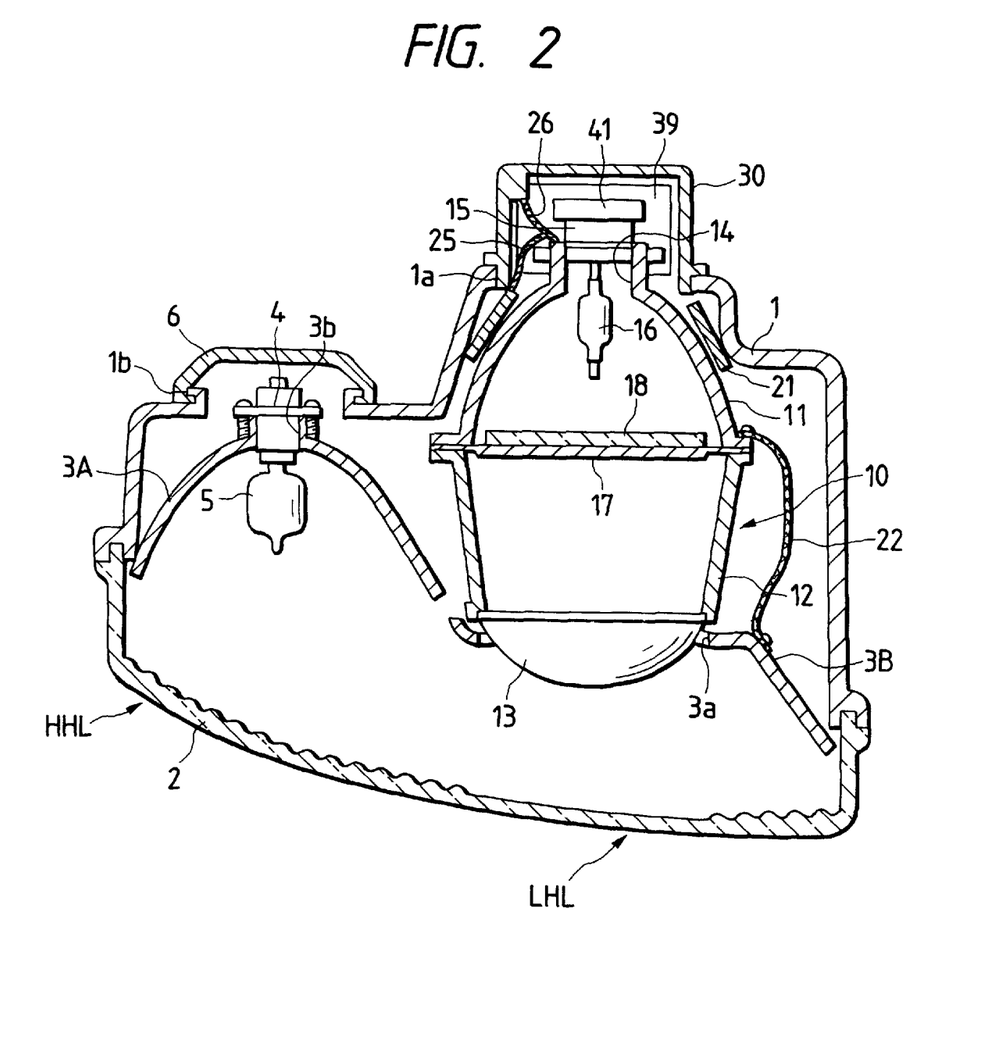
FIG. 2 is a sectional view taken on line 2—2 in FIG. 1(*a*).
Figure 3:
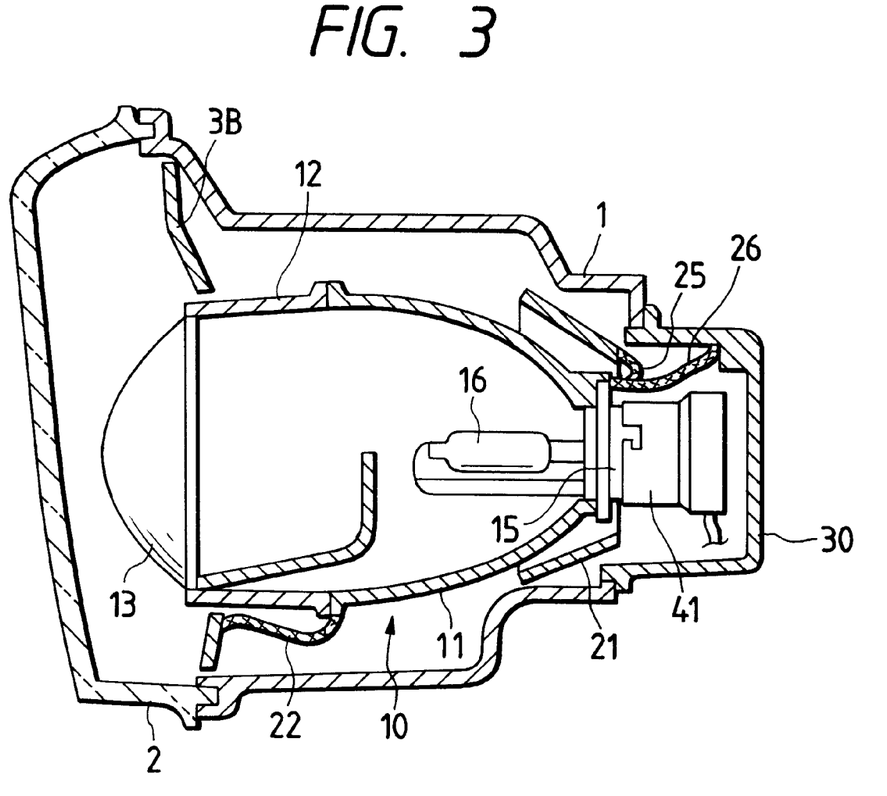
FIG. 3 is a sectional view taken on line 3—3 in FIG. 1(*a*).
Figure 4:
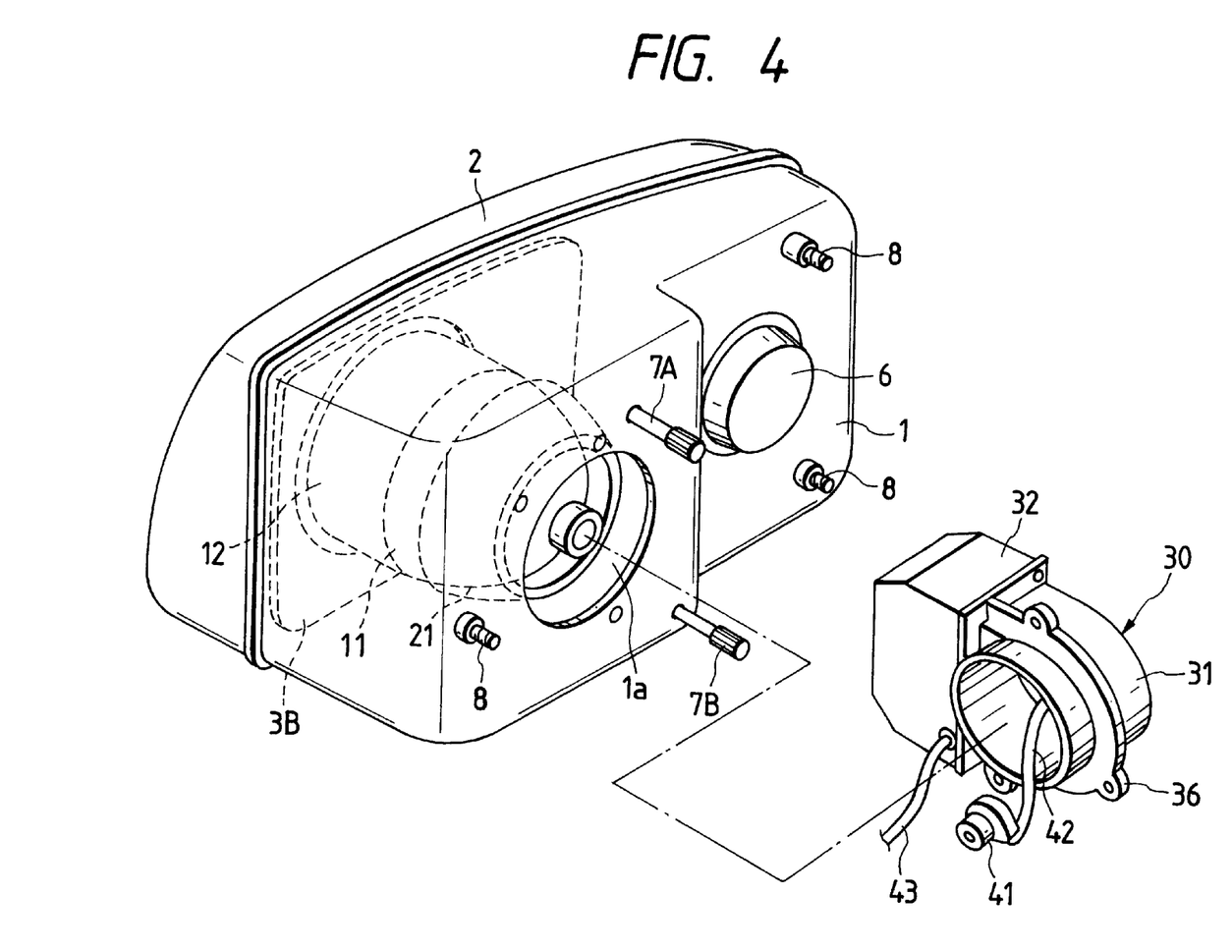
FIG. 4 is a perspective view showing the front lamp when viewed from the rear side.

The present invention will be described with reference to the accompanied drawings. FIGS. 1(*a*) and 1(*b*) are front and back views showing an embodiment in which a lamp assembled according to the present invention is applied to a car front lamp; FIGS. 2 and 3 are views taken on lines of 2—2 and 3—3, respectively, in FIG. 1(*a*) respectively; and FIG. 4 is a perspective view showing this embodiment when viewed from the rear side. In the drawings, the front lamp is configured as a left lamp of so-called four-lamp type front lamps constituted by a running beam lamp HHL and a passing beam lamp LHL which are formed integrally with each other. A lens 2 is attached to a front surface opening portion of a lamp body 1 to thereby define a lamp chamber. A reflector 3A is disposed in a region in the lamp chamber so as to act as a reflector of the running beam lamp HHL. Further, an extension reflector 3B of the passing beam lamp LHL is disposed in a lamp chamber adjacent to the first-mentioned lamp chamber. The extension reflector 3B is made of a metal material or a resin molding and a conductive layer is formed on its surface and also the layer formed as mirrored surface. An opening 3a is provided in the extension reflector 3B. A passing beam unit 10 is disposed in the opening 3a so as to close the gap between the passing beam unit 10 and the lamp body. In the running beam lamp HHL, a bulb insertion hole 3b is formed in the rear surface of the reflector 3A and a bulb 5 is supported by a socket connector 4 attached to the bulb insertion hole 3b. A bulb insertion hole 1b is formed in the rear surface of the lamp body 1 in a position behind the socket connector 4 and is closed by a back cover 6.

The passing beam unit 10 is configured as a projector lamp, and its housing is constituted by a reflector (focusing mirror) 11 made of a metal material such as aluminum or the like and having a rotary elliptical surface, a cylindrical lens holder 12 attached by screws on a front-side opening flange of the reflector 11 and made of a metal material such as aluminum or the like, and a lens 13 attached on a front end portion of the lens holder 12. The housing is supported on the lamp body 1 through aiming adjusting mechanisms 7A and 7B (only a part thereof is illustrated in FIG. 4) so as to be aiming-adjustable in up/down and right/left directions. As the aiming adjusting mechanism, a known configuration utilizing an aiming bolt is adopted, and therefore a detailed explanation thereof is omitted here. Further, the lamp body 1 is fixed on a car body by means of stud bolts 8 planted on the rear surface of the lamp body 1.

Figure 6:
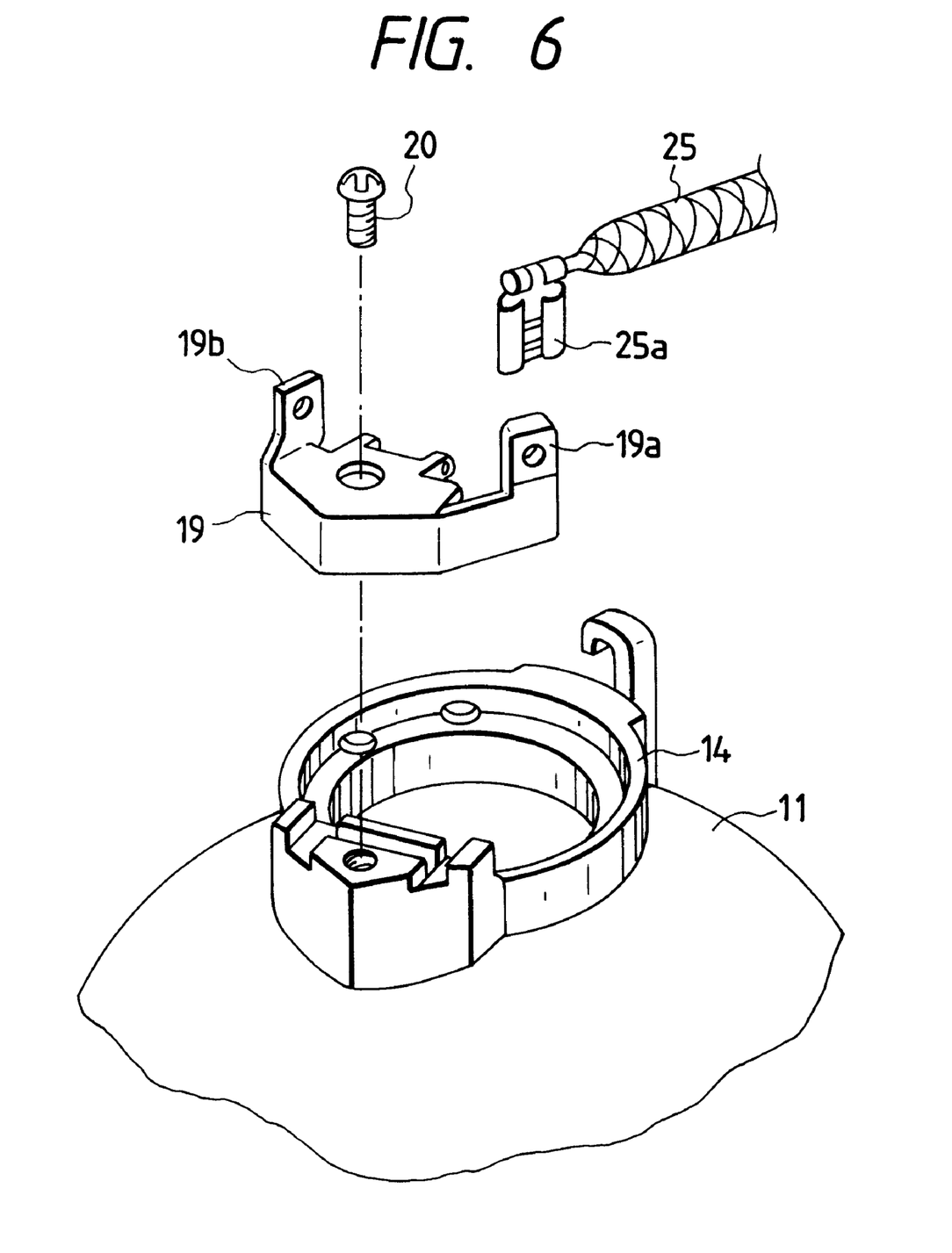
FIG. 6 is an exploded perspective view showing the connection of a ground wire and ground terminal.

The socket connector 15 is attached to the bulb insertion hole portion 14 opened in the rear surface of the reflector 11 and a discharge bulb 16 is supported by means of the socket connector 15 in a focusing position of the reflector 11. A shade 17 and a heat barrier plate 1B are supported by the lens holder 12 so as to satisfy a predetermined light distribution characteristic with respect to the discharge bulb 16. Moreover, as shown in the exploded perspective view of FIG. 6, a ground terminal 19 formed by processing a metal plate is fixed on one side portion of the bulb insertion hole portion 14 of the reflector 11 by means of a small screw 20. Two contact portions 19a and 19b are integrally formed with the ground terminal 19 and ground wire is attached to each of the contact portions 19a and 19b as described later.

Figure 5:
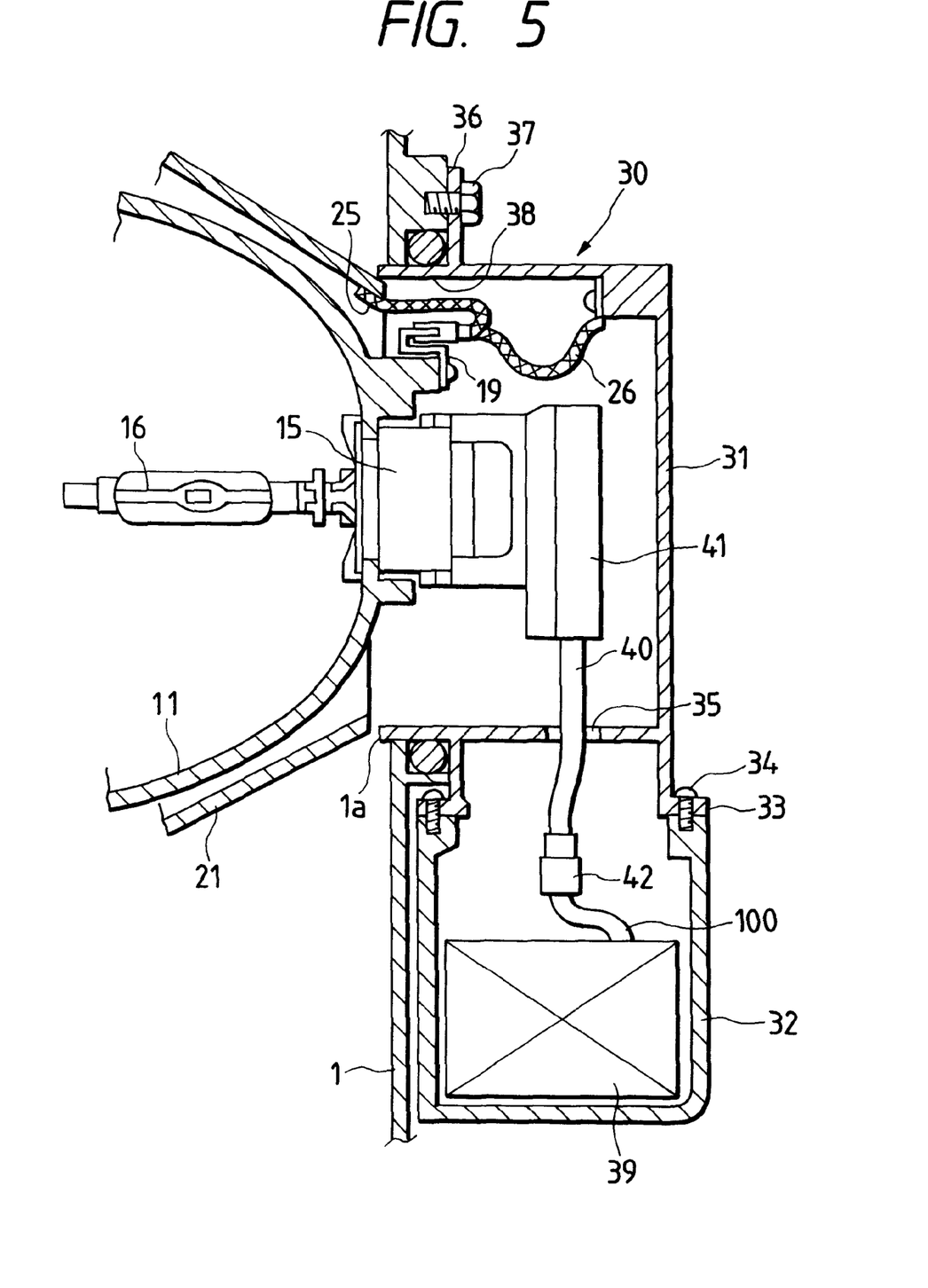
FIG. 5 is a partial sectional view taken on line 5—5 in FIG. 1(*b*).

Further, in the inside of the lamp body 1, a shielding member (such as the tube 21) made of a metal material is formed into an approximately cone-like shape so as to enclose the circumference of the socket connector of the passing beam unit 10 and so as to be fixedly supported along an inner surface of the lamp body 1. Moreover, an opening window 1a through which the discharge bulb 16 can be attached/removed together with the socket connector 15 is provided in the rear surface of the lamp body 1 in which the passing beam unit 10 is accommodated. Part of a turn-on circuit for turning-on the discharge bulb 16, that is, a turn-on circuit casing 30 in which a starter portion is accommodated, is attached to the opening window 1a. In this embodiment, the turn-on circuit casing 30 is made of a metal material such as aluminum or the like and attached in a slightly inclined position with respect to the up-down direction of the lamp body 1. As shown in FIG. 5, which is a partial sectional view along the 5—5 line in FIG. 1(b), the turn-on circuit casing 30 is constituted by upper and lower casings 31 and 32 so as to be divided into two.

The upper casing 31 is shaped like a short sideward cylindrical vessel, and a rectangular flange 33 provided on a portion of the peripheral wall of the upper casing 31 is connected to an opening portion of the lower casing 32 by means of screws 34. Further, an opening 35 is provided in a portion of the peripheral wall located at a bottom surface of the upper casing 31 so as to communicate with the lower casing 32. The upper casing 31 is integrally and fixedly supported on the lamp body 1 by utilizing tongue-like screw insertion hole portions 36 (three are shown in the drawing figures), bolts 37, and a seal ring 38. The lower casing 32, on the other hand, is a substantially rectangular vessel.

A starter circuit portion 39 which is a part of the turn-on circuit is accommodated in the turn-on circuit casing 30. The starter circuit portion 39 has a known circuit configuration provided with a transformer and a capacitor. Most of the parts of the starter circuit portion 39 are accommodated in the lower casing 32, while residual parts are disposed in a region along an inner peripheral surface of the upper casing 31. A cord 40 to which a high voltage is applied is extended from the lower casing 32 to the upper casing 31 through the opening 35 formed in the peripheral wall. The cord 40 is connected, at its front end portion, to a connector 41 which is fitted in the socket connector 15. The cord 40 is connected at its other end to a connector 42 which is connected to another cord 100 from the starter circuit portion 39. Further, a low-voltage primary distribution cord 43 of the starter circuit portion 39 is led outside through a notch portion provided in a connection portion between an upper edge portion of the lower casing 32 and the upper casing 31 (see FIG. 4). By utilizing the outer conductors of the primary distribution cord 43, the lower and upper casings 32 and 31 are connected to a ground electrode of a car at the same time so that the turn-on circuit casing 30 is held at the ground potential.

Figure 7:
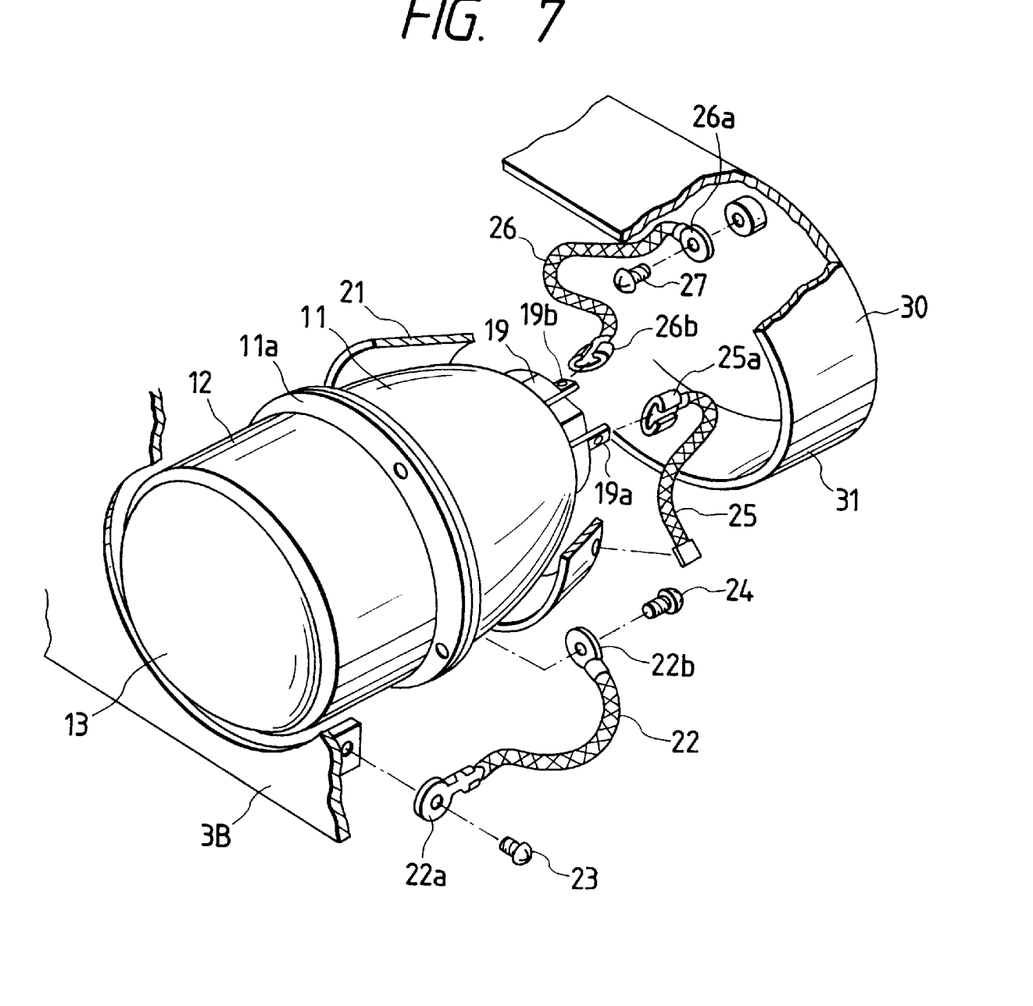
FIG. 7 is an exploded perspective view showing an electrical connection structure.

In the foregoing configuration, the extension reflector 3B is electrically connected to the reflector 11 as shown in the exploded diagram of FIG. 7 which shows an electrical connection structure. This electrical connection is performed by using ground wire 22 made of gauze wire and provided at its opposite end portions with lugs 22a and 22b which are fixed thereon by caulking. The lug 22a on one end portion is fixed to the extension reflector 3B by means of a screw 23 and the lug 22b on the other end portion is fastened integrally with a portion of the flange 11a of the reflector 11 by means of a screw 24 for fixing the lens holder.

Similarly to the extension reflector 3B, the shielding tube 21 is electrically connected to the reflector 11. In this electrical connection, ground wire 25 made of gauze wire and having a fitting portion 25a fixed at one end portion of the wire 25 by caulking is used. The fitting portion 25a fixed on the one end portion is fitted into the one connection portion 19a of the ground terminal 19 which is fixed on the reflector 11. The other end portion of the ground wire 25 is soldered to a portion of the shielding tube 21.

Further, the upper casing 31 of the turn-on circuit casing 30 is electrically connected to the reflector 11. In this electrical connection, ground wire 26 made of gauze wire is used. A lug 26a and a fitting portion 26b are fixed by caulking at one and the other end of the ground wire 26, respectively. The lug 26a on the one end portion is fixed to the upper casing 31 by means of a screw 27, and the fitting portion 26b on the other end portion is fitted to the other connection portion 19b of the ground terminal 19. As a result, the lens holder 12, the shielding tube 21, and the extension reflector 3B are electrically connected to the reflector 11. Further, the reflector 11 is held at the ground potential through the turn-on circuit casing 30.

In the thus configured vehicle lamp, the discharge bulb 16 is disposed in the inside of the metal reflector 11 and lens holder 12, and the reflector 11 and the lens holder 12 are held at the ground potential. Therefore, electromagnetic waves radiated from the discharge bulb 16 are shielded by the reflector 11 and the lens holder 12 to thereby be prevented from being radiated to the peripheral portion of the discharge bulb 16. Further, a path constituted by the starter circuit portion 39, the cord 40, the discharge bulb 16, the discharge bulb socket 41, and the like, through which a high voltage is generated and transmitted is enclosed by the turn-on circuit casing 30, and electromagnetic waves radiated toward the back side of the lamp body from the starter circuit portion 39 and the cord 40 as well as the socket connector 15 of the discharge bulb 16 are shielded by means of the turn-on circuit casing 30.

Moreover, of the electromagnetic waves radiated from the socket connector 15 of the discharge bulb 16, the circumferentially radiated electromagnetic waves are shielded because the shielding tube 21 is held at the ground potential, so that the electromagnetic waves are prevented from being radiated to the outside of the lamp body 1. Furthermore, electromagnetic waves radiated toward the front side of the lamp body 1 through the gap between the shielding tube 21, the reflector 11 and the lens holder 12 are shielded by the extension reflector 3B which closes the gap and which is held to the ground potential. Thus, these electromagnetic waves are prevented from being radiated to the front side of the lamp body 1.

In experiments carried out by the inventors of this application, it has been found that in the case of employing such a configuration in which the lens holder 12 is directly electrically connected to the reflector 11, while the extension reflector 3B, the shielding tube 21, and the turn-on circuit casing 30 are collectively electrically connected to the reflector 11 through the ground wire made of gauze wire, an extremely effective shielding of electromagnetic waves can be obtained in comparison with the case where the foregoing members are separately and individually connected to the ground.

Further, in this embodiment, it is sufficient to dispose the shielding tube 21, which is to be arranged in the circumference of the reflector 11, only in the circumferential region of the reflector 11 at the rear side thereof so as to enclose the circumference of the socket connector 15. Therefore, when the reflector 11, the lens holder 12, and the like are tilted in the up/down and right/left directions at the time of aiming adjustment, the reflector 11 and the lens holder 12 are prevented from being interfered with the shielding tube 21, and, as a result, the gap therebetween is reduced to- thereby make it possible to prevent the lamp body 1 from being increased in size uselessly.

In this embodiment, the turn-on circuit casing 30 is divided into the upper and lower casings 31 and 32. Therefore, when it is necessary to examine the starter circuit portion 39 or to exchange parts thereof, the lower casing 32 is removed from the upper casing 31 so that the lower casing 32 is removed from the lamp body 1 in the state where the upper casing 31 is still attached on the lamp body 1. Since it is not necessary to remove the entire turn-on circuit casing 30 from the lamp body 1 as described above, maintenance, repair, etc. can be easily performed even in the case where a car space behind a lamp body is narrow. In this case, as shown in FIG. 5, if the cord 40 and the starter circuit portion 39 are connected to each other through the connector 42 in the inside of the lower casing 32, separation can be performed at this connection, and the lower casing 32 can be extremely easily attached/removed so as to make it possible to easily perform the assembling work of the turn-on circuit casing 30 and the lamp.

Figure 8:
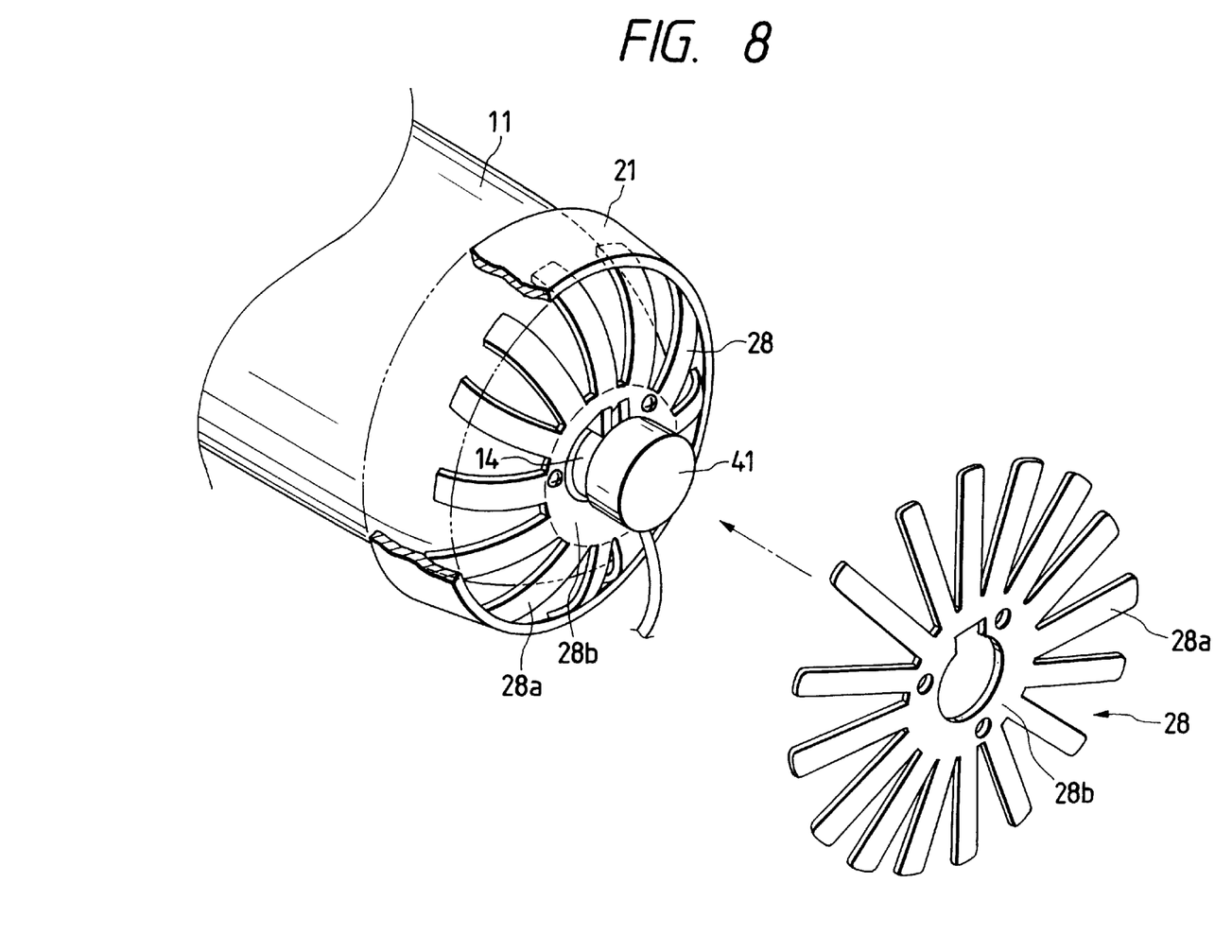
FIG. 8 is a perspective view showing a main part of another embodiment of the present invention.

Further, in order to prevent electromagnetic waves from radiating from the gap between the reflector 11 and the shielding tube 21, there may be provided, as shown in FIG. 8, a filter 28 made of a conductive material, for example, a metal plate, having elasticity and formed like petals of a flower. The filter 28 has a plurality of radially projecting shielding portions 28a provided around the circumference. The filter 28 is disposed so as to elastically contact the inner surface of the circumference of the shielding tube 21 in the state where a central circular portion 28b of the filter 28 is fixed by means of a screw to the bulb insertion hole portion 14 of the reflector 11, and the shielding portions 28a on the circumferential portion of the same are elastically biased against the inner surface of the shielding tube 21. Although not shown in the drawing figures, the shielding portions 28a are designed and produced such that each gap between adjacent shielding portions is extremely narrow.

By provision of the filter 28, the gap between the reflector 11 and the shielding tube 21 is substantially closed by the plurality of radially extended shielding portions 28a. Further, the filter 28 is fixed, at its central annular portion 28b, directly to the reflector 11 so that the filter 28 and the reflector 11 are electrically connected to each other, while the shielding portions 28a of the filter 28 at its peripheral portion contact directly with the shielding tube 21 so that the filter 28 is electrically connected to the reflector 11. Thus, the gap is shielded by the shielding portions 28a in the grounded state. As a result, electromagnetic waves are prevented from radiating through the gap. Further, by using the filter 28, it is possible to eliminate the ground wire 25 for electrically connecting the shielding tube 21 to the reflector 11 in this embodiment.

Although an example in which the present invention is applied to a car front lamp of the four-lamp type has been described above, the present invention can be applied to other vehicle lamps such as a front lamp of the two-lamp type, a fog lamp, etc. in the same manner as in the foregoing case so long as the lamp uses a discharge bulb as a light source. Further, the passing beam unit according to the present invention is not limited to such a projector lamp, but the present invention may be applied to any lamp in the same manner as in the foregoing case so long as the lamp has a parabolic reflector. If the shade disposed in front of the discharge bulb 5 in the reflector is made of a metal material and integrally formed with or electrically connected to the reflector or the lens holder, it is possible to suppress radiation of electromagnetic waves toward the front side of the discharge bulb.

As described above, according to the present invention, the reflector provided with the discharge bulb attached thereto is formed of a conductive material, and the lens holder attached to the reflector is formed of a conductive material, so that both the reflector and the lens holder are held at the ground potential. Therefore, electromagnetic waves radiated from the discharge bulb are shielded by the reflector and the lens holder so that EMI does not affect a car radio or other car electronic apparatuses. Moreover, the extension reflector and the shielding tube are disposed in the circumference of the reflector, and the extension reflector and the shielding tube are formed of a conductive material so that they can be electrically connected to the reflector so as to be held at the ground potential. Also, the turn-on circuit casing is made of a conductive material and is held at ground potential. Consequently, there is such an effect that electromagnetic waves radiated not only from the discharge bulb but also from the connector and the cord connected to the connector can be shielded in any of the forward, backward, and circumferential directions of the lamp.

What is claimed is:

1. A vehicle lamp with a discharge bulb, said vehicle lamp comprising:
   a lamp body in which the discharge bulb is disposed;
   a reflector made of a conductive material mounted inside said lamp body for reflecting light from the discharge bulb; and
   a casing attached to said lamp body at a position behind the discharge bulb, wherein said casing and said reflector are electrically connected with each other.

2. A vehicle lamp as recited in claim 1, wherein said casing is made of a conductive material, and said casing and said reflector both are electrically grounded.

3. A vehicle lamp as recited in claim 2, wherein said lamp body has an opening portion behind the discharge bulb, said casing cover the opening portion.

4. A vehicle lamp as recited in claim 1, further comprising a shielding member made of a conductive material disposed between said reflector and said lamp body around the discharge bulb, said shielding member being electrically connected to said reflector.

5. A vehicle lamp as recited in claim 4, wherein said shielding member is disposed at a rear end portion of said reflector so as to prevent interference between said reflector and said shielding member when a reflecting position of said reflector is adjusted.

6. A vehicle lamp as recited in claim 4, further comprising a filter made of a conductive material disposed between said shielding member and said reflector.

7. A vehicle lamp as recited in claim 6, wherein said filter has a plurality of elongate shielding portions that project radially out from a central circular portion of said filter.

8. A vehicle lamp as recited in claim 7, wherein said elongate shielding portions elastically contact an inner surface of said shielding member, and wherein said central circular portion of said filter is fixed to a bulb insertion hole portion of said reflector, so that said shielding member is electrically connected to said reflector by said filter.

9. A vehicle lamp as recited in claim 7, wherein adjacent ones of said elongate shielding portions are separated by a narrow gap.

10. A vehicle lamp as recited in claim 4, wherein said shielding member is shaped like a tube with an increasing diameter towards a front side of the vehicle lamp.

11. A vehicle lamp as recited in claim 1, further comprising a lens holder made of a conductive material attached to a front surface opening portion of said reflector and electrically connected to said reflector.

12. A vehicle lamp as recited in claim 1, further comprising an extension reflector made of a conductive material and disposed in said lamp body to at least partially close a gap between said reflector and said lamp body, said extension reflector being electrically connected to said reflector.

13. A vehicle lamp as recited in claim 1, further comprising a socket holder for attaching the discharge bulb to said reflector, and a terminal secured to a portion of said reflector adjacent said socket holder.

14. A vehicle lamp as recited in claim 13, further comprising a ground wire for electrically connecting said terminal to said casing.

15. A vehicle lamp as recited in claim 13, wherein said casing covering said scoket holder is electrically grounded to said terminal.

16. A vehicle lamp as recited in claim 1, further comprising:
   a shielding member made of a conductive material disposed between said reflector and said lamp body around the discharge bulb;
   a lens holder made of a conductive material attached to and contacting a front surface opening portion of said reflector so as to be electrically connected to said reflector; and
   an extension reflector made of a conductive material and disposed in said lamp body to at least partially close a gap between said reflector and said lamp body, wherein said shielding member and said extension reflector are electrically connected to said reflector with first and second grounding wires, respectively, and said reflector is electrically connected to said casing with a third grounding wire.

17. A vehicle lamp as recited in claim 1, wherein said casing comprises separate upper and lower casings that are attached to each other.

18. A vehicle lamp as recited in claim 17, further comprising a starter circuit disposed in said lower casing.

19. A vehicle lamp as recited in claim 18, further comprising a primary distribution cord for supplying electrical power to said starter circuit.

20. A vehicle lamp as recited in claim 19, wherein outer conductors of said primary distribution cord electrically connect said casing with a ground terminal of a vehicle in which the vehicle lamp is secured.

* * * * *